United States Patent

Nakayama et al.

[11] Patent Number: 5,830,979
[45] Date of Patent: Nov. 3, 1998

[54] POLYESTER RESIN FOR ELECTROPHOTOGRAPHY TONER, PROCESS FOR PREPARING THE SAME, AND AN ELECTROPHOTOGRAPHIC TONER COMPRISING THE SAME

[75] Inventors: Koji Nakayama; Haruo Okutani, both of Shizuoka, Japan

[73] Assignee: Tomoegawa Paper Co., Ltd., Tokyo, Japan

[21] Appl. No.: 818,682

[22] Filed: Mar. 14, 1997

[30] Foreign Application Priority Data

Mar. 15, 1996 [JP] Japan .................................. 8-113053

[51] Int. Cl.$^6$ .............................. G03G 9/00; C08G 63/12
[52] U.S. Cl. ......................... 528/272; 528/296; 430/109; 430/904
[58] Field of Search .................... 528/272, 296; 430/104, 914

[56] References Cited

U.S. PATENT DOCUMENTS

| | | | |
|---|---|---|---|
| 4,980,448 | 12/1990 | Tajiri et al. | 430/109 |
| 4,988,794 | 1/1991 | Kubo et al. | 528/272 |
| 5,015,724 | 5/1991 | Kawabe | 528/272 |
| 5,057,596 | 10/1991 | Kubo et al. | 528/272 |
| 5,276,127 | 1/1994 | Takyu et al. | 528/296 |
| 5,483,016 | 1/1996 | Aoki et al. | 528/272 |
| 5,486,444 | 1/1996 | Bayley et al. | 530/109 |

*Primary Examiner*—Peter A. Szekely
*Attorney, Agent, or Firm*—Oblon, Spivak, McClelland, Maier & Neustadt, P.C.

[57] ABSTRACT

A polyester resin for a toner, wherein a maximum molecular weight is in a range of $1\times10^3$ to $8\times10^3$, Mw/Mn is in a range of 20 to 200, a proportion of component having a molecular weight of $1\times10^5$ or less is comprised at a range of 80 weight % or greater, and at least one component selected from the group consisting of polycarboxylic acid having more than 3 carboxyl groups and polyalcohol having more than 3 hydroxyl groups.

7 Claims, No Drawings

POLYESTER RESIN FOR ELECTROPHOTOGRAPHY TONER, PROCESS FOR PREPARING THE SAME, AND AN ELECTROPHOTOGRAPHIC TONER COMPRISING THE SAME

BACKGROUND OF THE INVENTION

1. Field of the Invention

The present invention relates to a toner for electrophotography which is used in printers or coelectrophotography machines utilizing heat-roll fixing. Moreover, the present invention relates to a polyester resin used in the toner for electrophotography, and to a process for preparing the same.

2. Description of the Related Art

Recently, various improvements or modifications on coelectrophotography machines or printers utilizing electrophotography have been desired as these machines have become more popular. For example, it has been desired to reduce energy consumption in order for these machines to be practical for home use. It is also desirable to make the machines run at high speeds in order to promote the spread of the machines into so called gray areas between printers and copiers. It is also necessary to simplify the structure of the machine in order to reduce the cost of the machines. Moreover, it has become popular to use the machines having functions of printing on both sides of the printed sheet and delivering the printed sheet automatically. Of the above-described requirements, particularly desired is a toner for electrophotography (hereafter, referred to simply as "toner") having a lower fixing temperature, a good anti-offset quality and fixing strength so that spots are not generated in a printed sheet in printing both sides of the printed sheet.

In order to achieve the requirements in the past, the following were suggested, improving the molecular weight and the molecular weight distribution of a binder resin, and the like.

Specifically in order to give a good low temperature fixing property to the toner, it is preferable to use a binder resin having a lower molecular weight. By using a resin having a lower molecular weight, such as styrene-acrylic resin, as a binder resin, the fixing property at low temperatures can be improved; however, a toner comprising styrene-acrylic resin is fragile, and the toner is easily crushed by stress in the developing machine. As a result, the distribution of the particle size of a toner is changed, or a crushed toner easily coagulates with a carrier particle or a developing sleeve; and when the toner is used for copying over a long period, the image quality unavoidably deteriorates by changing charging properties. Moreover, spots are generated when printing on both sides of the printed sheet and when delivering the printed sheet automatically.

On the other hand, when the molecular weight of a polyester resin was to be lower, the melting point thereof became lower, simultaneously the viscosity thereof became lower, therefore, an offset phenomena to a fixing roller was generated. In order to prevent generating the offset phenomena, it was suggested to introduce a crosslinking structure to the polyester resin to widen the molecular distribution of polyester resin. The molecular weight distribution can be widen by introducing a crosslinking structure, therefore, the generation of the offset phenomena can be prevented. However, the total molecular weight range of polyester resin also became wider, therefore, the fixing properties of the toner comprising such polyester resin became worse. Consequently, in order to give sufficient fixing properties to the toner, it was necessary to lower the glass transition temperature (Tg) of the resin. Therefore, it is difficult to avoid deterioration of the storage properties of the toner comprising the resin. In this way, it is difficult to provide a toner having anti-offset properties, satisfactory storage properties, and low temperature fixing properties.

SUMMARY OF THE INVENTION

Therefore, it is an object of the present invention is to provide a polyester resin for a toner, wherein a maximum molecular weight is in a range of $1 \times 10^3$ to $8 \times 10^3$, weight average molecular weight ($M_w$)/number average molecular weight ($M_n$) is in a range of 20 to 200, a proportion of components having a molecular weight of $1 \times 10^5$ or less at a range of 80 weight % or greater; and at least one component selected from the group consisting of polycarboxylic acid having more than 3 carboxyl groups and polyalcohol having more than 3 hydroxyl groups.

The present invention also provides a toner comprising the polyester resin for a toner, and a process for preparing the polyester resins for a toner.

DESCRIPTION OF THE PREFERRED EMBODIMENTS

In the following, preferred embodiments of the polyester resin used to make the toner, a toner comprising the same, and a process for preparing polyester resin will be presented.

The polyester resin for a toner of the present invention has a maximum molecular weight in a range of $1 \times 10^3$ to $8 \times 10^3$ of a chromatogram, which is measured by Gel Permeation Chromatography (abbreviated to "GPC" hereinbelow). Besides the range, a molecular weight peak(s) or a molecular weight peak shoulder may be in a range of $8 \times 10^3$ or greater.

When the maximum molecular weight is in a range of $1 \times 10^3$ or less, the glass transition temperature of the polyester resin becomes low, and the storage properties become worse. In contrast, when the maximum molecular weight is in a range of $8 \times 10^3$ or greater, a melting viscosity becomes high, and the toner comprising the polyester resin cannot be sufficiently melted by a heat fixing roller, therefore, the low temperature fixing properties thereof becomes worse.

The Mw/Mn of the polyester resin for a toner of the present invention is in a range of 20 to 200.

When the Mw/Mn is in a range of 20 or less, the proportion of the component having high molecular weight is small, therefore, the melting viscosity at high temperature is too low, and high temperature offset is generated. In contrast, when the Mw/Mn is in a range of 200 or greater, the proportion of the component having high molecular weight is large, therefore, the melting viscosity is too high, and the toner comprising the polyester resin cannot be sufficiently melted by a heat fixing roller, and the low temperature fixing properties become worse.

In order to improving the low temperature fixing properties of the toner, it is preferable to comprise the low molecular weight compounds at a high proportion. Therefore, as the resin comprising the toner of the present invention, which has good low temperature fixing properties, it is necessary that the proportion of the component having $1 \times 10^5$ or less is 80 weight % or greater of all binder resin. Moreover, in order to maintain the low temperature fixing properties satisfactorily, it is necessary that the proportion of the component having $1 \times 10^4$ or less is 50 weight % or greater of all binder resin.

In the following, the polyester resin of the present invention will be presented.

In the present specification, the molecular weight of the resin is measured by GPC at flowing conditions. That is, GPC is measured by injecting 8 mg of sample (concentration: 0.4 gr./dl, temperature: 25° C., solvent: tetrahydrofuran) into a flowing solvent (tetrahydrofuran) with a current speed of 1 ml/min. The measurement conditions are selected so as the molecular weight distribution of the samples is in a straight calibration curve between logarithms of standard molecular weights of monodisperse polyethylene standard samples and count values. Confidences of measurements are confirmed that Mw/Mn of the polystyrene standard sample (sample: NBS 706; Mw: $28.8 \times 10^4$; Mn: $13.7 \times 10^4$; Mw/Mn: 2.11) is equal 2.11 ±0.10 at these conditions.

The polyester resin of the present invention is prepared from the following raw materials.

The diol components, polyalcohol having hydroxyl group of more than 3 hydroxyl groups, dicarbonic acid components, polycarboxylic acid component having more than 3 carboxyl groups used for syntheses of the polyester resin of the present invention, for instance, are as follows.

The diol components are, for example, polyoxypropylene bisphenol A, polyoxyethylene bisphenol A, polyoxyethylene biphenol, polyoxypropylene biphenol, diethanol amine, ethylene glycol, diethylene glycol, propylene glycol, isopylene glycol, octane diol, 2,2-diethyl-1,3-propane diol, spiro glycol, neopenthyl glycol, 1,3-butanediol, 1,4-butane diol, 2-butyl-2-ethyl-1,3-propane diol, 1,6-hexane diol, hexylene glycol, 1,5-pentane diol, 3-methyl-1,5-pentane diol, hydrobenzoin, bis(β-hydroxyethyl) terephthalate, bis(hydroxybutyl)terephthalate, and the like.

The polyalcohol having hydroxyl group of at least 3 hydroxyl groups are, for example, sorbitol, 1,2,3,6-hexanetetrol, 1,4-sorbitan, pentaerythritol, dipentaerythritol, tripentaerythritol, 1,2,4-butane triol, 1,2,5-pentane triol, glycerol, diglycerol, 2-methylpropane triol, 2-methyl-1,2,4-butane triol, trimethyolethane, trimethylolpropane, 1,3,5-trihydroxy benzene and the like.

The dicarbonic acid components and low alcohol ester component thereof are, for example, fumaric acid, maleic acid, phthalic acid, isophthalic acid, itaconic acid, mesaconic acid, citraconic acid, glutaconic acid, terephthalic acid, cyclohexane dicarboxylic acid, succinic acid, adipic acid, dodecanoic diacid, naphthalene dicarboxylic acid, biphenyl-4,4-dicarboxylic acid, 2,3-piperazine-dicarboxylic acid, imino dicarboxylic acid, imidazol-4,5-dicarboxylic acid, piperizine dicarboxylic acid, N-phenylpyrazol dicarboxylic acid, pyridine dicarboxylic acid, carbazole-3,6-dicarboxylic acid, 9-methylcarbazole-3,6-dicarboxylic acid, carbazole-3,6-dibutyric acid, carbazole-3,6-r,r'-diketobutyric acid, 4-hydroxyisophthalic acid, 2,5-dihydroxy-1,4-benzene diacetic acid, chelidomic acid, bis(2-hydroxy-3-carboxyphenyl)methane, anhydrides thereof, low alkyl esters thereof, and the like.

The polycarboxylic acid component having at least 3 carboxyl groups are, for example, trimellitic acid, 1,2,4-cyclohexane tricarboxylic acid, 1,2,4-naphthalene tricarboxylic acid, 2,5,7-naphthalene tricarboxylic acid, pyridine tricarboxylic acid, pyridine-2,3,4,6-tetracarboxylic acid, pyridine-1,2,7,8-tetracarboxylic acid, butane tetracarboxylic acid, anhydrides thereof, low alkyl esters thereof and the like.

In the following, the preparation process for the polyester resin of the present invention will be presented.

The preparation process for the polyester resin of the present invention is characterized in that the polyester resin containing polycarboxylic acid component having more than 3 carboxyl groups and/or polyalcohol having hydroxyl group of more than 3 hydroxyl groups, in the presence of a linear polyester resin having a maximum molecular weight peak in a range of $1 \times 10^3$ to $8 \times 10^3$.

Exactly, at first, the linear polyester resin having a molecular weight peak in a range of $1 \times 10^3$ to $8 \times 10^3$ is synthesized in a first polycondensation reaction, by using a monomer comprising the diol component and dicarbonic acid component.

In this reaction, when the molecular weight peak is less than $1 \times 10^3$, the glass transition temperature thereof is lower, and the glass transition temperature of the obtained crosslinked resin after the reaction is too low, therefore the storage properties becomes worse. In contrast, when the molecular weight peak is more than $8 \times 10^3$, the melt starting temperature of the obtained crosslinked resin in after reaction is above 105° C., the toner comprising the resin cannot be melted by a fixing roller, and the low temperature fixing properties becomes worse. Therefore, it is not preferable that the molecular weight peak of the polyester resin of the present invention is in a range of $1 \times 10^3$ or less.

Moreover, it is necessary for the linear polyester resin prepared in the above-mentioned process that the total amount of an acid value and hydroxyl group value be equal to 100 KOH mg/g or less. When the total amount of an acid value and hydroxyl group value is equal to 100 KOH mg/g or greater, that is, the functional group of the linear polyester resin is in large quantities, the molecular weight of polyester resin of the present invention which is obtained in after steps is larger; therefore, the maximum molecular weight peak is above $8 \times 10^3$, the melting viscosity thereof is high, and the low temperature fixing properties become worse. Therefore, in order to hold the molecular weight of the polyester resin of the present invention low, to hold the melt starting temperature low, and to maintain good low temperature fixing properties, it is most preferable that the total amount of the acid value and hydroxyl group value be equal to 50 KOH mg/g or less.

Moreover, in the present specification, the acid value and the hydroxyl group value mean the values measured in accordance with Japanese Industrial Standard K 0070.

The acid value and the hydroxyl group values are defined as the values measured by the following method.

(Acid Value: based upon Japanese Industrial Standard K0070)
1. Reagent used
   solvent: tetrahydrofuran (THF)
   indicator: phenolphtalein (0.1% ethanol solution)
   titrant: 1/100N potassium methoxide solution (benzene:methanol=9:1)
2. Instruments used
   100 ml trianglular flask
   graduated glass
   stirrer
   stirrer tip
   buret
3. Measuring steps
   1. 0.5 g of sample was measured and put into the 100 ml triangular flask.
   2. 30 ml of THF was added, and a stirrer tip was put into the flask, and began to stirring.

3. Indicator (phenolphthalein) was added, titrating the sample with 1/100N potassium methoxide solution with stirring by the stirrer.

(Hydroxyl group value: based upon Japanese Industrial Standard K0070)

1. Use reagent solvent: tetrahydrofuran (THF)

acetylated indicator: acetic anhydride (0.5 g) pyridine (100 ml)

indicator: phenolphtalein (0.1% ethanol solution)

titrant: 1/100N potassium methoxide solution (benzene:methanol=9:1)

2. Use instruments 100 ml triangular flask 100 ml measuring flask graduated glass stirrer stirrer tip buret 3. Measuring steps 1. 0.02 g of sample was measured and put into the 100 ml triangluar flask.
   2. Acetylated solution was made. 0.5 g of acetic anhydride was added to the 100 ml measuring flask, and the 100 ml measuring flask was made full with pyridine.
   3. 5 ml of the obtained acetylated solution was added, and the solution comprising the sample was prepared.
   4. Acetylation was performed in a warm silicone bath for 1 hour, then cooled, and 1 ml of water was added from the upper part of the cooling tube.
   5. Further heating for 10 minutes, then cooling, 5 ml of THF was added. At this time, THF was added to the triangular flask so as to run down (rinse) the inside wall of the flask.
   6. Indicator (phenolphthalein) was added, titrating the sample with 1/100N potassium methoxide solution while stirring by the stirrer.
   7. In the case of the blank test, the above steps were performed without adding sample.

Next, the polyester resin of the present invention is prepared by melting with heat 80 to 95 weight parts of the linear polyester resin obtained in the above-mentioned first step in a range of 180° to 230° C.; mixing 5 to 20 weight parts of at least one component selected from the group consisting of polycarboxylic acid component having more than 3 carboxyl groups and polyalcohol having more than 3 hydroxyl groups, and at least one component selected from the group consisting of diol component and dicarbonic acid component; and performing the second polycondensation reaction.

By performing the second polycondensation reaction, even if polymonomers having more than 3 functional groups are used, the linear polyester resins of the present invention, which do not have very large molecular weights, can be prepared. Moreover, in order to obtain a linear polyester resin having a desired molecular weight distribution, it is preferable to add promptly and simultaneously the monomers used for the second polycondensation reaction.

In order to improve the low temperature fixing properties, it is preferable to set the melt starting temperature of the polyester resin for a toner of the present invention at 60° to 105° C. When the melt starting temperature is less than 60° C., the blocking properties of the toner become worse, and the storage properties thereof becomes worse. In contrast, when the melt starting temperature is more than 105° C., the low temperature fixing properties becomes worse. Moreover, in order to obtain a sufficient fixing offset temperature range, it is preferable that a decline melting viscosity at high temperature be low, and the temperature difference between the softening temperature and the melt starting temperature is in a range of 15° to 45° C. When the temperature difference is less than 15° C., the fixing offset temperature range (non-offset temperature breadth) is narrow. In contrast, when the temperature difference is more than 45° C., anti-offset properties can be maintained, but the low temperature fixing properties becomes worse.

Melt starting temperatures and flow softening points were measured using a flow tester CF-500 manufactured by SHIMAZU SEISAKUJYO, measuring conditions are as follows:

plunger: 1 cm$^2$ diameter of dye: 1 mm length of dye: 1 mm load: 20 kgF preliminary heating temperature range: 50° C. to 80° C.

preliminary heating period: 300 sec temperature increase speed of 6° C./min.

Under the following conditions, the melt starting temperature was designated to be the temperature at the time when the plunger's descent began. Similarly, the flow softening point was designated to be the temperature at the time when the plunger had traversed half the distance between the point where it began its descent and the bottom of the apparatus.

In the following, the toner of the present invention will be presented.

Besides the polyester resins, other resins, pigments, magnetic powders, charge controlling agents, properties improving agents such as fluidized agents, and the like can be used for the toner of the present invention.

The toner of the present invention can be obtained by adding pigments, charge controlling agents and magnetic powder if needed, to the binder resin; mixing with a super mixer; melting and kneading them with a Danbury mixer, roll mill, kneader, or extruder; rough pulverizing with a cutter mill, hammer mill or the like; fine pulverizing with a jet mill; classifying with a wind power classifier; and then mixing the classified toners with additives.

Representative examples of binder resins in company with the above-mentioned polyester resins include, styrene resins, styrene-acrylic copolymer resin, polyester resins, polyethylene resins, epoxy resins, silicon resins, polyamide resins, polyurethane resins, and the like.

Representative examples of said pigment include, carbon black, nigrosine, aniline blue, charcoal blue, chromium yellow, ultramarine blue, dupone oil red, quinine yellow, Methylene Blue Chloride, phtalocyanine blue, malachite green ocsalate, lamp black, Rose Bengal mixture thereof and the like. In order to form a sufficient visible image, it is necessary to include the pigments at a sufficient ratio. In general, the pigment is added at a ratio of 1–20 weight parts to 100 weight parts of the binder resin.

Representative examples of the magnetic powders include, metals having strong magnetic properties, such as ferrites, magnetite, iron, cobalt, nickel, alloys thereof and compounds comprising these elements; alloy which does not comprised strong magnetic elements but shows strong magnetic properties when preferable heat treatment is performed, such as Hustler's alloy comprising Mn or Cu such as Mn-Cu-Al, Mn-Cu-Sn, chromium dioxide, and the like.

These magnetic powders are dispersed in the binder resin in a form of an average particle size of 0.1 to 1 micron. The adding amount of the magnetic powders are 20 to 70 weight parts to 100 parts of the binder resin, more preferable 40 to 70 weight parts.

The two-component developer can be obtained by mixing the toner prepared in the above-mentioned steps and carriers such as ferrite powders or iron powders. Moreover, one component developer can be obtained by adding the magnetic member to the toner.

The toner of the present invention comprises a polyester resin in which the maximum molecular weight is in a range of $1 \times 10^3$ to $8 \times 10^3$, Mw/Mn is in a range of 20 to 200, the proportion of components having a molecular weight of $1 \times 10^5$ or less is comprised at a range of 80 weight % or greater, and at least one component selected from the group consisting of polycarboxylic acid having more than 3 carboxyl groups and polyalcohol having more than 3 hydroxyl groups; therefore, the cohesive force of the toner in a melting state can be improved, as a result, an offset phenomena can be prevented. The effect which can be obtained by certain high molecular parts is given to polyester resins having low molecular weight, and low melting viscosity.

Moreover, increases in the melt starting temperature can be restrained by controlling the proportion of the low molecular weight components of the polyester resin, and then good low temperature fixing properties can be obtained.

The fixing strength of the toner layer after fixing can be improved by forming crosslinking structures partly in the polyester resin, and the fixing strength of the toner can be increased. Therefore, the generation of spots can be prevent in a printed sheet when printing both sides of the printed sheet.

Consequently, the high grade low fixing properties of the toner can be obtained by employing the preparation process of controlling the molecular weight of polyester resin in a certain range, in which the low temperature fixing properties and the anti-offset properties are simultaneously satisfactory. The high grade low fixing properties of the toner of the present invention have not been obtained by styrene resin and polyester resin as in the past.

The present invention also provides a toner comprising the polyester resin for a toner, and a process for preparing the polyester resins for a toner.

EXPERIMENTAL EXAMPLES

The following are experimental examples based on the resin composition and the toner embodiments of the present invention presented above. In the Examples, "parts" mean "parts by weight".

Example 1

316 g (1 mol) of polyoxyethylene bisphenol A, 166 g (1 mol) of terephthalic acid, 0.005 g of di-butyltin oxide as a catalyst were put into a round bottom flask having four inlet portions provided with an agitator, a condenser, and an inlet for nitrogen gas. The linear polyester resin (I) of the present example was obtained by reacting the mixture while introducing nitrogen gas from the inlet, heating the mixture at 200° C. for 1 hour; and after an outflow of water was completed, raising the temperature gradually to 230° C. for 1 hour; mixing for 2 hours maintaining this temperature; taking out the obtained melted polyester resin; and cooling.

The Tg (°C.) of the obtained linear polyester resin (I) was 68° C.; the melt starting temperature thereof was 88° C.; the softening point thereof was 102° C., the peak top molecular weight was $6.5 \times 10^3$; Mw/Mn was 2.8; the proportion of the component having a molecular weight of $1 \times 10^5$ or less is 100 weight % of the obtained polyester resin; the ratio of the component having a molecular weight of $1 \times 10^4$ or less is 70 weight % of the obtained polyester resin; the acid value was 18 KOH mg/g, and the hydroxyl group value was 23 KOH mg/g.

Next, 100 g of the obtained linear polyester resin (I) was put into a round bottom flask having four inlet portions provided with an agitator, a condenser, and an inlet for nitrogen gas. The polyester resin (A) was obtained by reacting the mixture while introducing nitrogen gas from the inlet, heating and stirring it at 180° C. for 1 hour; simultaneously adding 5.8 g of butane tetracarboxylic acid, 10 g of polyethylene glycol (the hydroxyl group value: 558 KOH mg/g, molecular weight: 200), and 0.3 g of di-butyltin laurate as a catalyst; raising the temperature to 200° C., stirring the mixture while maintaining this temperature for 1 hour; and stopping the reaction when the resin wound the agitator.

The Tg (°C.) of the obtained polyester resin (A) was 57° C.; the melt starting temperature thereof was 85° C.; the softening point thereof was 123° C., the peak top molecular weight was $6.6 \times 10^3$; Mw/Mn was 122; the proportion of the component having a molecular weight of $1 \times 10^5$ or less is 83 weight % of the obtained polyester resin; the proportion of the component having a molecular weight of $1 \times 10^4$ or less is 50 weight % of the obtained polyester resin.

Example 2

100 g of the obtained linear polyester resin (I) in the Example 1 was put into a round bottom flask having four inlet portions provided with an agitator, a condenser, and an inlet for nitrogen gas.

The polyester resin (B) was obtained by reacting the mixture while introducing nitrogen gas from the inlet, heating and stirring it at 180° C. for 1 hour; simultaneously adding 4.6 g of butane tetracarboxylic acid, 8 g of polyethylene glycol (the hydroxyl group value: 558 KOH mg/g, molecular weight: 200), and 0.3 g of di-butyltin laurate as a catalyst; raising the temperature to 200° C., stirring the mixture while maintaining this temperature for 1 hour; and stopping the reaction when the resin wound the agitator. The Tg (°C.) of the obtained polyester resin (B) was 60° C.; the melt starting temperature thereof was 84° C.; the softening point thereof was 114° C., the peak top molecular weight was $6.6 \times 10^3$; Mw/Mn was 71; the proportion of the component having a molecular weight of $1 \times 10^5$ or less is 85 weight % of the obtained polyester resin; the proportion of the component having a molecular weight of $1 \times 10^4$ or less is 51 weight % to the obtained polyester resin.

Example 3

100 g of the obtained linear polyester resin (I) in the Example 1 was put into a round bottom flask having four inlet portions provided with an agitator, a condenser, and an inlet for nitrogen gas. The polyester resin (C) was obtained by reacting the mixture while introducing nitrogen gas from the inlet, heating and stirring it at 180° C. for 1 hour; simultaneously adding 3.5 g of butane tetracarboxylic acid, 6 g of polyethylene glycol (the hydroxyl group value: 558 KOH mg/g, molecular weight: 200), and 0.3 g of di-butyltin laurate as a catalyst; raising the temperature to 200° C., stirring the mixture while maintaining this temperature for 1 hour; and stopping the reaction when the resin wound the agitator.

The Tg (°C.) of the obtained polyester resin (C) was 63° C.; the melt starting temperature thereof was 84° C.; the softening point thereof was 109° C., the peak top molecular weight was $6.5 \times 10^3$; Mw/Mn was 45; the proportion of the component having a molecular weight of $1 \times 10^5$ or less is 86 weight % of the obtained polyester resin; the proportion of the component having a molecular weight of $1 \times 10^4$ or less is 52 weight % of the obtained polyester resin.

Example 4

316 g (1 mol) of polyoxyethylene bisphenol A, 133 g (0.8 mol) of terephthalic acid, 0.005 g of di-butyltin oxide as a catalyst were put into a round bottom flask having four inlet portions provided with an agitator, a condenser, and an inlet for nitrogen gas. The linear polyester resin (II) of the present example was obtained by reacting the mixture while introducing nitrogen gas from the inlet, heating the mixture at 200° C. for 1 hour; and after an outflow of water being completed, raising the temperature gradually to 230° C. for 1 hour; mixing for 2 hours maintaining this temperature; taking out the obtained melted polyester resin; and cooling.

The Tg (°C.) of the obtained linear polyester resin (II) was 65° C.; the melt starting temperature thereof was 87° C.; the softening point thereof was 100° C., the peak top molecular weight was $6.1 \times 10^3$; Mw/Mn was 2.9; the proportion of the component having a molecular weight of $1 \times 10^5$ or less is 100 weight % of the obtained polyester resin; the proportion of the component having a molecular weight of $1 \times 10^4$ or less is 73 weight % of the obtained polyester resin; the acid value was 10 KOH mg/g, and the hydroxyl group value was 110 KOH mg/g.

Next, 100 g of the obtained linear polyester resin (II) was put into a round bottom flask having four inlet portions provided with an agitator, a condenser, and an inlet for nitrogen gas. The polyester resin (D) was obtained by reacting the mixture while introducing nitrogen gas from the inlet, heating and stirring it at 180° C. for 1 hour; simultaneously adding 5.8 g of butane tetracarboxylic acid, 10 g of polyethylene glycol (the hydroxyl group value: 558 KOH mg/g, molecular weight: 200), and 0.3 g of di-butyltin laurate as a catalyst; raising the temperature to 200° C., stirring the mixture while maintaining this temperature for 1 hour; and stopping the reaction when the resin wound the agitator.

The Tg (°C.) of the obtained polyester resin (D) was 58° C.; the melt starting temperature thereof was 99° C.; the softening point thereof was 139° C., the peak top molecular weight was $7.6 \times 10^3$; Mw/Mn was 41; the proportion of the component having a molecular weight of $1 \times 10^5$ or less is 80 weight % of the obtained polyester resin; the proportion of the component having a molecular weight of $1 \times 10^4$ or less is 45 weight % of the obtained polyester resin.

Example 5

100 g of the obtained linear polyester resin (I) in the Example 1 was put into a round bottom flask having four inlet portions provided with an agitator, a condenser, and an inlet for nitrogen gas. The polyester resin (E) was obtained by reacting the mixture while introducing nitrogen gas from the inlet, heating and stirring it at 180EC for 1 hour; simultaneously adding 5.3 g of pentaerythritol, 5 g of 1,12-dodecane dicarboxylic acid, and 0.3 g of di-butyltin laurate as a catalyst; raising the temperature to 200° C., stirring the mixture while maintaining this temperature for 1 hour; and stopping the reaction when the resin wound the agitator.

The Tg (°C.) of the obtained polyester resin (E) was 63° C.; the melt starting temperature thereof was 88° C.; the melting point thereof was 128° C., the peak top molecular weight was $7.0 \times 10^3$; Mw/Mn was 33; the proportion of the component having a molecular weight of $1 \times 10^5$ or less is 80 weight % of the obtained polyester resin; the proportion of the component having a molecular weight of $1 \times 10^4$ or less is 48 weight % of the obtained polyester resin.

Example 6

100 g of the obtained linear polyester resin (I) in the Example 1 was put into a round bottom flask having four inlet portions provided with an agitator, a condenser, and an inlet for nitrogen gas. The polyester resin (F) was obtained by reacting the mixture while introducing nitrogen gas from the inlet, heating and stirring it at 180° C. for 1 hour; simultaneously adding 3.7 g of pentaerythritol 3.5 g of 1,12-dodecane dicarboxylic acid, and 0.3 g of di-butyltin laurate as a catalyst; raising the temperature to 200° C., stirring the mixture while maintaining this temperature for 1 hour; and stopping the reaction when the resin wound the agitator.

The Tg (°C.) of the obtained polyester resin (F) was 65° C.; the melt starting temperature thereof was 87° C.; the softening point thereof was 126° C., the peak top molecular weight was $6.8 \times 10^3$; Mw/Mn was 31; the proportion of the component having a molecular weight of $1 \times 10^5$ or less is 84 weight % of the obtained polyester resin; the proportion of the component having a molecular weight of $1 \times 10^4$ or less is 53 weight % of the obtained polyester resin.

Comparative Example 1

The same weights of the same raw materials used in Example 1 were used. That is, 316 g (1 mol) of polyoxyethylene bisphenol A, 166 g (1 mol) of terephthalic acid, 5.8 g of butane tetracarboxylic acid, 10 g of polyethylene glycol (the hydroxyl group value: 558 KOH mg/g, molecular weight : 200), and 0.5 g of di-butyltin laurate as a catalyst were put into a round bottom flask having four inlet portions provided with an agitator, a condenser, and an inlet for nitrogen gas. The polyester resin (G) of the present comparative example was obtained by reacting the mixture while introducing nitrogen gas from the inlet, heating the mixture at 200° C.; and after an outflow of water was completed, raising the temperature gradually to 230 ° C. for 1 hour; mixing for 2 hours while maintaining the temperature; taking out the obtained melted polyester resin; and cooling.

The polyester resin (G) of the present comparative example was prepared using the same weight of the same raw materials used in Example 1. However, two reaction steps were separately performed in Example 1, in contrast, one reaction step using the same weights of the same raw materials as in Example 1 was performed in the Comparative Example.

The Tg (°C.) of the obtained polyester resin (G) was 55° C.; the melt starting temperature thereof was 106° C.; the softening point thereof was 149° C., the peak top molecular weight was $9.8 \times 10^3$; Mw/Mn was 34; the proportion of the component having a molecular weight of $1 \times 10^5$ or less is 75 weight % of the obtained polyester resin; the proportion of the component having a molecular weight of $1 \times 10^4$ or less is 40 weight % of the obtained polyester resin.

Comparative Example 2

100 g of the obtained linear polyester resin (I) in the Example 1 was put into a round bottom flask having four inlet portions provided with an agitator, a condenser, and an inlet for nitrogen gas. The polyester resin (H) was obtained by reacting the mixture while introducing nitrogen gas from the inlet, heating and stirring it at 180° C. for 1 hour; adding 10.0 g of polyethylene glycol (hydroxyl group value: 558 KOH mg/g; molecular weight: 200), stirring the mixture for 1 hour until a uniform mixture was obtained; adding 5.8 g of butane tetracarboxylic acid, and 0.3 g of butyltin oxide as a catalyst; raising the temperature to 200° C.; stirring the mixture while maintaining the temperature for 1 hour; and stopping the reaction when the resin wound the agitator.

The Tg (°C.) of the obtained polyester resin (H) was 56° C.; the melt starting temperature thereof was 105° C.; the softening point thereof was 138° C., the peak top molecular weight was $9.0 \times 10^3$; Mw/Mn was 35; the proportion of the component having a molecular weight of $1 \times 10^5$ or less is 78 weight % of the obtained polyester resin; the proportion of the component having a molecular weight of $1 \times 10^4$ or less is 42 weight % of the obtained polyester resin.

Comparative Example 3

The linear polyester resin (I) prepared in Example 1 is used as the polyester resin (I) in this Comparative Example.

Comparative Example 4

The linear polyester resin (II) prepared in Example 4 is used as the polyester resin (J) in this Comparative Example.

The polyester resins (A) to (J) prepared in Examples and Comparative Examples, and other component were mixed with a Super Mixer at the following composition.

polyester resins 97 parts carbon black 6.5 parts (MA-100, produced by MITSUBISHI CHEMICAL INDUSTRIES Co., Ltd.)

metallic dye containing chromium 2 parts ("Bontron S-34", produced by ORIENT CHEMICAL INDUSTRIES Co., Ltd.)

polypropylene 3 parts ("Viscol 330P", produced by SANYOKASEI INDUSTRIES Co., Ltd)

After melting and kneading the mixture, the particles having an average particle diameter of 11 μm were obtained by classifying. The negatively charged toner particles were prepared by staining 0.3 parts of hydrophobic $SiO_2$ ("R-972"produced by AEROSIL Co., Ltd.) to the surface of the obtained classified particles, using a Herschel Mixer.

The following evaluation tests were performed on the obtained toner.

(1) Non Offset-Temperature Range, and Non Offset-Temperature Breadth Two component developers were obtained, which is comprised of 4 parts of the obtained toners in Examples and Comparative Examples and 96 parts of non-coated Ferrite carrier (trade name: FL-1020, marketed by Powder Teck Co.). The obtained developers were used to produce stripe test patterns of 20 mm×50 mm size on A4 size printing paper using a copying machine (trade name: SF-9800, marketed by SHARP Co.).

Next, a fixing device having a thermal fixing roll whose surface is covered with fluorine-contained resin, and a press fixing roll whose surface is covered with silicone were used to fix the above unfixed test patterns. The fixing conditions were: pressure of the press fixing roll of 1 kg/cm², and roll speed of 200 mm/sec. The temperature of the surface of the thermal fixing roll was made to rise gradually. A temperature range that no toner smudging was observed in a white margin of the printing sheet was defined as a Non Offset-Temperature Range. A difference of temperature between the lowest temperature and the highest temperature in the Non Offset-Temperature Range was defined as an Non Offset-Temperature Breadth.

(2) Fixing Strength

The unfixed test patterns were fixed by using a thermal fixing roll having a surface temperature of 130° C. The image densities of the fixed test patterns were measured, after rubbing them with cotton pads under a constant rubbing pressure. The image densities were measured by an illuminameter (trade name: RD-914, marketed by Macbeth). The fixing strength, in %, was determined according to the following mathematical expression, (After-rubbing image density/as-fixed image density)×100

The results of evaluation testing are summarized in Tables 1 and 2.

TABLE 1

|  | Example | | | | | |
|---|---|---|---|---|---|---|
|  | 1 | 2 | 3 | 4 | 5 | 6 |
| Linear polyester resin used | (I) | (I) | (I) | (II) | (I) | (I) |
| Polyester resins of the present invention used | A | B | C | D | E | F |
| Glass transition temperature (°C.) | 57 | 60 | 63 | 58 | 63 | 65 |
| Melt starting temperature (°C.) | 85 | 84 | 84 | 99 | 88 | 87 |
| Softening temperature (°C.) | 123 | 114 | 109 | 139 | 128 | 126 |
| Temperature difference between softening temperature and melt starting temperature (°C.) | 38 | 30 | 25 | 40 | 40 | 39 |
| Peak top molecular weight ($\times 10^3$) | 6.6 | 6.6 | 6.5 | 7.6 | 7.0 | 6.8 |
| Mn/Mw | 122 | 71 | 45 | 41 | 33 | 31 |
| Proportion of resin having molecular weight of $1 \times 10^5$ or less (weight %) | 83 | 85 | 86 | 80 | 80 | 84 |
| Proportion of resin having molecular weight of $1 \times 10^4$ or less (weight %) | 50 | 51 | 52 | 45 | 48 | 53 |
| Fixing strength (%) | 86 | 92 | 98 | 75 | 79 | 82 |
| Non-offset temperature range | 105~195 | 105~190 | 100~180 | 115~220 | 110~200 | 110~200 |
| Non-offset temperature breadth (°C.) | 80 | 85 | 80 | 105 | 90 | 90 |

TABLE 2

|  | Comparative Example | | | |
|---|---|---|---|---|
|  | 1 | 2 | 3 | 4 |
| Linear polyester resins used | I | I | I | II |
| Polyester resins used | G | H | I | J |
| Glass transition temperature (°C.) | 55 | 56 | 68 | 65 |
| Melt starting temperature (°C.) | 106 | 105 | 88 | 87 |
| Softening temperature (°C.) | 149 | 138 | 102 | 100 |
| Temperature breadth between softening temperature and melt starting temperature (°C.) | 43 | 33 | 14 | 13 |
| Peak top molecular weight ($\times 10^3$) | 9.8 | 9.0 | 6.5 | 6.1 |
| Mn/Mw | 34 | 35 | 2.8 | 2.9 |
| Proportion of resin having molecular weight of $1 \times 10^5$ or less (weight %) | 75 | 78 | 100 | 100 |

TABLE 2-continued

|  | Comparative Example | | | |
|---|---|---|---|---|
|  | 1 | 2 | 3 | 4 |
| Proportion of resin having molecular weight of $1 \times 10^4$ or less (weight %) | 40 | 42 | 70 | 73 |
| Fixing strength (%) | 49 | 53 | — | — |
| Non-offset temperature range (°C.) | 130–230 | 130–220 | * | * |
| Non-offset temperature breadth (°C.) | 100 | 90 | no | no |

In Table 2, * indicates an offset phenomena occurs in all temperature range.

It is clear from Tables 1 and 2 that the toners of Examples have a fixing strength of 70% or greater even when the temperature of the heat fixing roller is 130° C. The value of 70% in fixing strength is satisfactory.

In contrast, the fixing strengths of the toners prepared in Comparative Examples 1, and 2 is low. Moreover, a Non-offset temperature range for the toner prepared in Comparative Example 3 cannot be obtained, the toner is of no practical use.

What is claimed is:

1. A polyester resin for a toner, wherein
   a maximum molecular weight is in a range of $1 \times 10^3$ to $8 \times 10^3$;
   weight average molecular weight ($M_w$)/number average molecular weight ($M_n$) is in a range of 20 to 200;
   a proportion of component having a molecular weight of $1 \times 10^5$ or less is comprised at a range of 80 weight % or greater; and
   at least one component selected from the group consisting of polycarboxylic acid having more than 3 carboxyl groups and polyalcohol having more than 3 hydroxyl groups.

2. A polyester resin for a toner as claimed in claim 1, wherein a proportion of component having a molecular weight of $1 \times 10^4$ or less is comprised at a range of 50 weight % or greater.

3. A polyester resin for a toner as claimed in claim 1, wherein the melt starting temperature is in a range of 60° to 105° C.

4. A polyester resin for a toner as claimed in claim 1, wherein the temperature difference between softening temperature and melt starting temperature is in a range of 15° to 45° C.

5. A process for preparing a polyester resin for a toner according to claim 1, comprising reacting at least one component selected from the group consisting of polycarboxylic acid component having more than 3 carboxyl groups, and polyalcohol having hydroxyl group of more than 3 hydroxyl groups, in the presence of a linear polyester resin having a maximum molecular weight peak in a range of $1 \times 10^3$ to $8 \times 10^3$, and the total amount of an acid value and hydroxyl group value being equal to 100 KOH mg/g or less.

6. A process for preparing a polyester resin for a toner claimed in claim 5 wherein the total amount of an acid value and hydroxyl group value is equal to 50 KOH mg/g or less of the linear polyester resin.

7. A toner for electrophotography comprising a polyester resin, having a molecular weight in a range of $1 \times 10^3$ to $8 \times 10^3$, weight average molecular weight ($M_w$)/number average molecular weight ($M_n$) in a range of 20 to 200, a proportion of a component having a molecular weight of $1 \times 10^5$ or less at a range of 80 weight % or greater, and at least one component selected from the group consisting of polycarboxylic acid having more than 3 carboxyl groups and polyalcohol having more than 3 hydroxyl groups; and pigments.

* * * * *